(12) United States Patent
Osaka et al.

(10) Patent No.: US 6,301,032 B1
(45) Date of Patent: *Oct. 9, 2001

(54) OPTICAL MULTIPLEXING/ DEMULTIPLEXING DEVICE

(75) Inventors: Takeo Osaka, Yokohama; Shin-ichirou Harasawa, Kawasaki, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,566

(22) Filed: Mar. 16, 1998

(30) Foreign Application Priority Data

Oct. 16, 1997 (JP) .................................... 9-283278

(51) Int. Cl.⁷ ...................................................... H04J 14/02
(52) U.S. Cl. .......................... 359/124; 359/130; 359/173; 385/24; 385/37
(58) Field of Search .................................. 359/124, 128, 359/127, 130, 173; 385/24, 37

(56) References Cited

U.S. PATENT DOCUMENTS

| 5,283,686 | 2/1994 | Huber | 359/337 |
|---|---|---|---|
| 5,579,143 | 11/1996 | Huber | 359/130 |
| 5,926,300 | * 7/1999 | Miyakawa et al. | 359/124 |
| 5,946,430 | * 8/1999 | Morrow et al. | 385/24 |
| 5,982,518 | * 11/1999 | Mizrahi | 359/130 |

FOREIGN PATENT DOCUMENTS

| 713110 | 5/1996 | (EP) . |
| 794629 | 9/1997 | (EP) . |
| 55-135804 | 10/1980 | (JP) . |
| 62-75406 | 4/1987 | (JP) . |

* cited by examiner

*Primary Examiner*—Kinfe-Michael Negash
(74) *Attorney, Agent, or Firm*—Staas & Halsey LLP

(57) ABSTRACT

A circulator guides wavelength multiplexed light that is received from a main transmission path to a 1st fiber grating. The 1st fiber grating reflects light of wavelength $\lambda 1$. Wavelength multiplexed light that has passed through the 1st fiber grating is guided to a 2nd fiber grating. The 2nd fiber grating reflects light of wavelength $\lambda n$. The circulator guides the signal light that has been reflected from the 1st and 2nd fiber gratings to a branch transmission path. The length of the transmission path between the 1st and 2nd fiber gratings is determined based on the transmission rate or frequency of the signal that is transmitted using light of wavelength $\lambda n$.

10 Claims, 10 Drawing Sheets

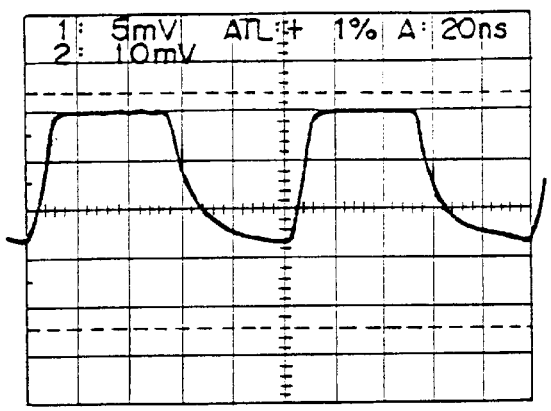
F I G. 7A
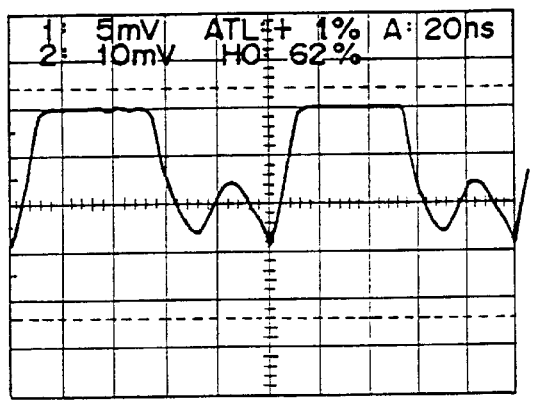
F I G. 7B
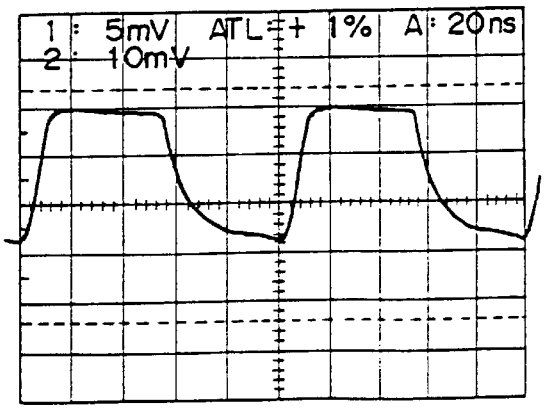
F I G. 7C

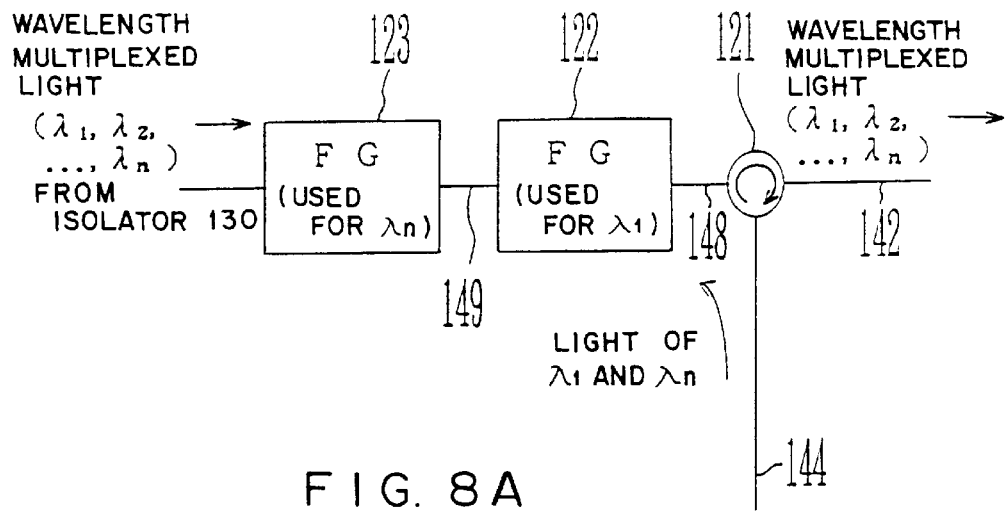
F I G. 8A
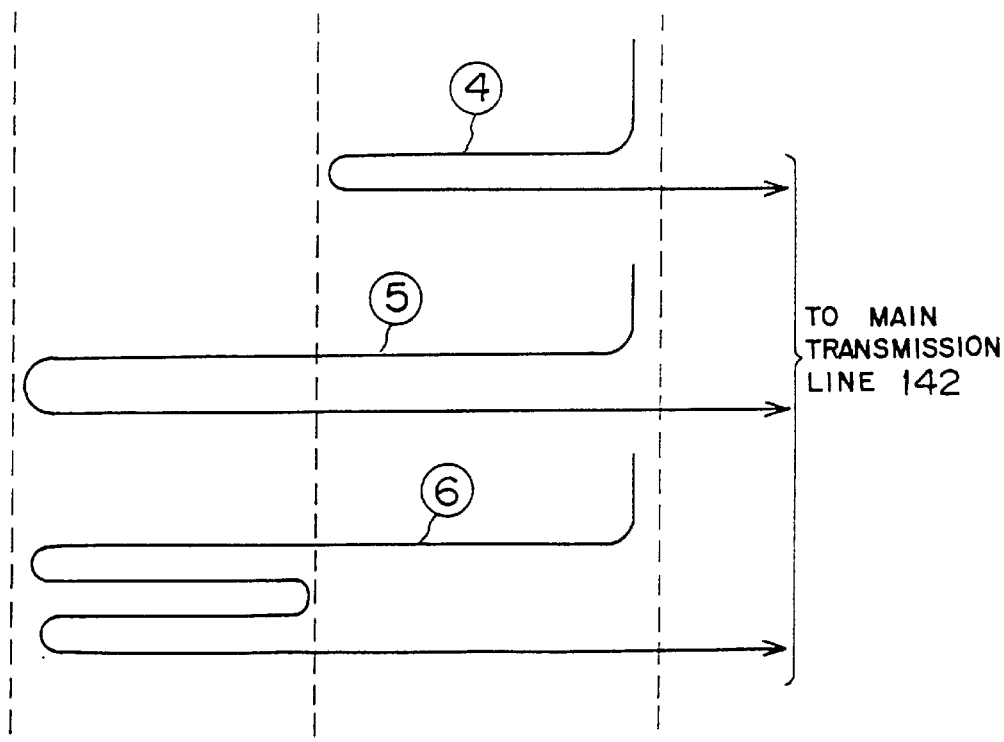
F I G. 8B

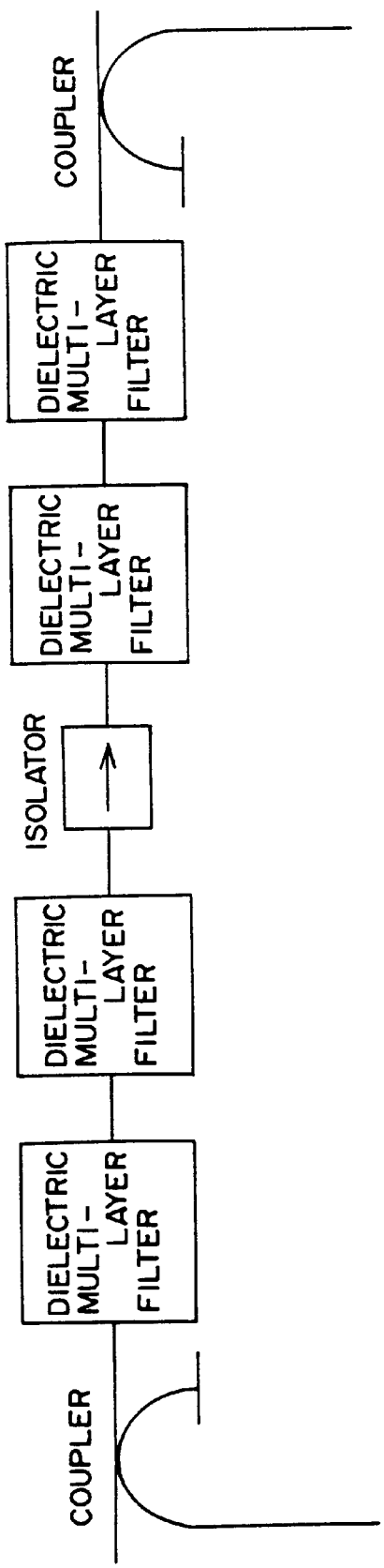
F I G. 10

OPTICAL MULTIPLEXING/ DEMULTIPLEXING DEVICE

BACKGROUND OF THE INVENTION

1. Field of the Invention

This invention relates to a device that multiplexes and demultiplexes light. In particular, it relates to a device that demultiplexes signal light of a particular wavelength from multi-wavelength light, or multiplexes light of a particular wavelength into multi-wavelength light.

2. Description of the Related Art

As the use of information processing technology spreads to many different fields, the amount of information transferred via networks is increasing. As this happens, many network transmission paths have come to be made of optical fiber to increase the distance, speed and amount of information transmitted.

In optical transmission systems, in recent years the wavelength division multiplexing transmission method has been attracting attention as a technology for transmitting large amounts of information. Wavelength division multiplexing transmission is a technology in which a plurality of signals to be transmitted are put onto carriers of different wavelengths and then the plurality of wavelengths are multiplexed for transmission through a single optical fiber. In a wavelength division multiplexing transmission system, in general, the plurality of wavelengths are respectively called channels.

In a wavelength division multiplexing transmission system, a device that extracts particular signals from the plurality of signals that are transmitted as wavelength multiplexed light, and a device that adds signals to be transmitted to wavelength multiplexed light, are necessary. In order to extract a particular signal from a plurality of multiplexed signals, a device that separates light of the wavelength that carries that particular signal from the wavelength multiplexed light is necessary. A device such as this is called a light demultiplexing device. Meanwhile, in order to add a signal that is to be transmitted to wavelength multiplexed light, a device that multiplexes light of the wavelength that carries the signal to be transmitted to the wavelength multiplexed light is necessary. Such a device is called a light multiplexing device.

FIG. 1 shows the basic configuration of a light multiplexing and demultiplexing device. This light multiplexing and demultiplexing device consists of the demultiplexing device 10 that demultiplexes light of wavelength $\lambda 1$ from wavelength multiplexed light consisting of the wavelengths $\lambda 1$, $\lambda 2, \ldots, \lambda n$; the multiplexing device 20 that multiplexes light of wavelength $\lambda 1$ into the wavelength multiplexed light; and the isolator 30 that is installed between the demultiplexing device 10 and the multiplexing device 20. The demultiplexing device 10 includes the circulator 11, and the fiber grating 12 that reflects light of wavelength $\lambda 1$; the multiplexing device 20 includes the circulator 21, and the fiber grating 22 that reflects light of wavelength $\lambda 1$.

The action of the demultiplexing device 10 is as follows. The circulator 11 guides wavelength multiplexed light that is input from the main transmission path 41 to the fiber grating 12. Among the plurality of wavelength components included in the wavelength multiplexed light, the fiber grating 12 reflects light of wavelength $\lambda 1$ to the circulator 11, and outputs light of wavelengths other than $\lambda 1$ to the isolator 30. The circulator 11 guides light of wavelength $\lambda 1$ reflected by the fiber grating 12 to the branch transmission path 43. In this way, the demultiplexing device 10 extracts light of wavelength $\lambda 1$ from the multi-wavelength light and outputs it to the branch transmission path 43.

The action of the multiplexing device 20 is as follows. When wavelength multiplexed light is received from the isolator 30, the fiber grating 22 guides that wavelength multiplexed light to the circulator 21. However, light of wavelength $\lambda 1$ does not pass through the fiber grating 22. The circulator 21 guides the wavelength multiplexed light received from the fiber grating 22 to the main transmission path 42. In addition, when light of wavelength $\lambda 1$ is received from the branch transmission path 44, the circulator 21 guides that light to the fiber grating 22. When light of wavelength $\lambda 1$ is received from the circulator 21, the fiber grating 22 reflects that light to the circulator 21. Then the circulator 21 guides the light of wavelength $\lambda 1$ that was reflected by the fiber grating 22 to the main transmission path 42. In this way, the multiplexing device 20 multiplexes the light of wavelength $\lambda 1$ received from the branch transmission path 44 into the wavelength multiplexed light received from the isolator 30, and outputs the resulting wavelength multiplexed light to the main transmission path 42.

FIG. 2A shows the configuration of a light demultiplexing device that extracts light of a plurality of wavelengths from wavelength multiplexed light. The configuration shown here extracts light of wavelengths $\lambda 1$ and $\lambda n$ from wavelength multiplexed light including the wavelengths $\lambda 1, \lambda 2, \ldots, \lambda n$. In FIG. 2A, the circulator 11 and the fiber grating 12 are the same as the corresponding items shown in FIG. 1. The fiber grating 13 is a reflecting element that reflects light of wavelength $\lambda n$.

The action of the light demultiplexing device shown in FIG. 2A is as follows. The circulator 11 guides wavelength multiplexed light input from the main transmission path 41 to the fiber grating 12. Then, as was explained with reference to FIG. 1, the fiber grating 12 reflects light of wavelength $\lambda 1$, from among the plurality of wavelength components included in the wavelength multiplexed light, to the circulator 11. Then the circulator 11 guides the light of wavelength $\lambda 1$ reflected by the fiber grating 12 to the branch transmission path 43.

Meanwhile, the wavelength multiplexed light that has passed through the fiber grating 12 is guided to the fiber grating 13. When this wavelength multiplexed light is received, the fiber grating 13 reflects the light of wavelength $\lambda n$ to the fiber grating 12, while light of wavelengths other than $\lambda n$ is output to the transmission path 45. The light of wavelength $\lambda n$ that was reflected by the fiber grating 13 passes through the fiber grating 12 and is guided to the circulator 11, and then is guided by the circulator 11 to the branch transmission path 43.

In this way, the light demultiplexing device shown in FIG. 2A demultiplexes light of wavelength $\lambda 1$ and light of wavelength $\lambda n$ from the wavelength multiplexed light, and outputs them to the branch transmission path 43.

In order to multiplex light of 2 or more different wavelengths into wavelength multiplexed light, it is sufficient to add a plurality of fiber gratings that reflect the respective plurality of wavelengths to the multiplexing device 20 shown in FIG. 1; the configuration is basically the same as that of the light demultiplexing device shown in FIG. 2A.

A fiber grating reflects light in a particular wavelength band. However, in general, the reflectivity is less than 100%, even within the reflected wavelength band. The reflection characteristics of a fiber grating are shown in FIG. 3A. The transmission characteristics of the same fiber grating are shown in FIG. 3B.

A fiber grating has, for example, a reflection wavelength band on the order of 1 to 2 nm. When the fiber grating receives light of a wavelength within this reflection wavelength band, it reflects that light. The loss in this reflection should ideally be 0, but in fact a loss of x (dB) occurs as shown in FIG. 3A. If the fiber grating receives light of a wavelength outside of the reflection wavelength band, ideally that light should not be reflected at all. However, in practice even for light of wavelengths outside of the reflection wavelength band there is reflection accompanied by a loss of x+y (dB).

Similarly, if a fiber grating receives light of a wavelength within the reflection wavelength band, ideally none of that light should be transmitted. However, in practice that light is transmitted with a loss of a+b (dB) as shown in FIG. 3B. When the fiber grating receives light of a wavelength that is outside of the reflection wavelength band, that light is transmitted. The loss in this transmission should ideally be 0, but in fact a loss of a (dB) occurs.

Thus, even when light is within the reflection wavelength band the fiber grating transmits part of it, and even if light is outside of the reflection wavelength band the fiber grating reflects part of it. This in turn sometimes causes coherent cross-talk in a light multiplexing and demultiplexing device. For example, in the light demultiplexing device shown in FIG. 2A, light of wavelength $\lambda n$ can be attenuated by coherent cross-talk. Referring to FIG. 2B, let us explain the coherent cross-talk in the light demultiplexing device shown in FIG. 2A.

As shown by path (1), light of wavelength $\lambda 1$ is basically reflected by the fiber grating 12, which is the reflective element used for $\lambda 1$, and guided to the branch transmission path 43. This reflected light is the signal light. Hereafter, this light will be referred to as the "signal light A1". The loss that occurs in this path is only the reflection loss (x) in the fiber grating 12.

However, as explained above, the fiber grating 12 transmits part of the light of wavelength $\lambda 1$. As shown by path (2), part of the light that has passed through the fiber grating 12 is reflected by the fiber grating 13, which is the reflective element for $\lambda n$, and guided to the branch transmission path 43. This reflected light is the interference light with respect to the signal light A1. Hereafter, this reflected light will be called the "interference light B1". In this path (2), reflection loss (x+y) occurs in the fiber grating 13 and transmission loss (2a+2b) occurs in the fiber grating 12.

As shown by path (3), part of the light of wavelength $\lambda 1$ that is reflected by the fiber grating 13 is further reflected by the fiber gratings 12 and 13, then is transmitted through the fiber grating 12 and output to the branch transmission path 43. This light is also interference light with respect to the signal light A1. Hereafter, this reflected light will be called "interference light C1". In path (3), in addition to the loss in path (2), there is an additional reflection loss (x) in the fiber grating 12 and reflection loss (x+y) in the fiber grating 13.

There is also some light which, after further passing repeatedly between the fiber gratings 12 and 13 is transmitted through the fiber grating 12 and guided to the branch transmission path 43, but the power of this light is very small, so it is neglected.

The respective powers of the signal light A1, the interference light B1 and the interference light C1 that are output to the branch transmission path 43 are as follows, where P is the power of the light of wavelength $\lambda 1$ input to this light demultiplexing device, and the loss in the circulator 11 is neglected:

signal light A1: P−x
interference light B1: P−2(a+b)−(x+y)
interference light C1: P−2(a+b)−2(x+y)−x The magnitude of the effect of the interference light with respect to the signal light depends on the difference between the power of the signal light and the power of the interference light; the smaller that power difference the greater the attenuation of the signal light by the interference light. The power difference between the signal light A1 and the interference light B1 is 2(a+b)+y; the power difference between the signal light A1 and the interference light C1 is 2(a+b)+2(x+y). Here, as shown in FIGS. 3A and 3B, the reflection loss y and the transmission loss b are large (in a typical fiber grating, y and b are both on the order of 20 dB), so the signal light B1 and C1 are sufficiently small relative to the signal light A1. Consequently, the attenuation of the signal light $\lambda 1$ is slight. That is to say, attenuation of a signal transmitted using light of wavelength $\lambda 1$ is small.

Meanwhile, as shown by path (2), light of wavelength $\lambda n$ is basically reflected by the fiber grating 13 that is the reflective element used for $\lambda n$ and output to the branch transmission path 43. This reflected light is the signal light. Hereafter, this reflected light will be called "signal light An". In this path, reflection loss (x) in the fiber grating 13 and transmission loss (2a) in the fiber grating 12 occur.

However, as discussed above, the fiber grating 12 reflects part of the light other than light of wavelength $\lambda 1$. That is to say, as shown by path (1), part of the light of wavelength $\lambda n$ is reflected by the fiber grating 12, which is the reflective element used for $\lambda 1$, and guided to the branch transmission path 43. This reflected light becomes the interference light with respect to the signal light An. Hereafter, this reflected light will be called the "interference light Bn". In this path, reflection loss (x+y) occurs in the fiber grating 12.

Further, as is shown by path (3), part of the light of wavelength $\lambda n$ that is reflected by the fiber grating 13 is further reflected by the fiber gratings 12 and 13, then passes through the fiber grating 12 and is output to the branch transmission path 43. This reflected light also becomes interference light with respect to the signal light An. This reflected light will be called the "interference light Cn". In path (3), in addition to the loss in path (2), there is an additional reflection loss (x+y) in the fiber grating 12, and a reflection loss (x) in the fiber grating 13.

Consequently, the respective light powers of the signal light An, the interference light Bn and the interference light Cn that are output to the branch transmission path 43 are given as follows, where P is the power of the light of wavelength $\lambda n$ that is input to this light demultiplexing device and the loss in the circulator 11 is neglected.

signal light An: P−2a−x
interference light Bn: P−(x+y)
interference light Cn: P−2(a+x)−(x+y)

Here, the reflection loss x and the transmission loss a (these are called dead losses, and are on the order of 0.2 dB in a typical fiber grating) are sufficiently small with respect to the reflection loss y and the transmission loss b, and so can be neglected, in which case we see that the power difference between the signal light An and the interference light Bn, and the power difference between the signal light An and the interference light Cn, are both on the order of y.

Thus, the power difference between the signal light and the interference light in the light of wavelength $\lambda n$ is small compared to the power difference between the signal light and the interference light in the light of wavelength $\lambda 1$, which makes it that much easier for the signal light to be attenuated.

As in the case in which light of wavelength λn is demultiplexed, if we assume that the power differences between each interference light (the interference light Bn and Cn) and the signal light (the signal light An) are respectively y dB, then the power difference between the signal light An and the interference light Bn and Cn becomes y−3 dB. In addition, in the case in which the state of polarization of the signal light and the states of polarization of each interference light are in agreement, and in the case in which the electric field of the signal light agrees with the electric fields of each interference light, it becomes easier for the signal light to be attenuated by the interference light. The deterioration in this case is on the order of a maximum of about 3 dB in each respective case, when converted into a power difference between the signal light and the interference light. Consequently, in the case in which light of wavelength λn is demultiplexed using the light demultiplexing device shown in FIG. 2A, in the worst case the power difference between the signal light and the interference light becomes on the order of y−9 dB.

The problems discussed above do not occur only when a plurality of wavelength components are demultiplexed from the wavelength multiplexed light; they can also occur when a plurality of wavelength components are multiplexed into wavelength multiplexed light.

Thus, in an existing type of light multiplexing and demultiplexing device, in a case in which a plurality of signal light beams are multiplexed or demultiplexed using a plurality of reflecting elements, it is possible that the signal light will be attenuated by the reflection characteristics of the reflecting elements and by multiple reflections among the reflecting elements.

SUMMARY OF THE INVENTION

The purpose of this invention is to resolve the problems discussed above; to provide a light demultiplexing device and a light multiplexing device that can suppress the deterioration or attenuation of the signal light when a plurality of signal light beams of different wavelengths are demultiplexed from wavelength multiplexed light or a plurality of signal light beams of different wavelengths are multiplexed into wavelength multiplexed light.

The light demultiplexing device of this invention assumes a configuration in which signal light of a particular wavelength is demultiplexed from wavelength multiplexed light, and has a path switching unit, and first and second reflecting elements.

First, second and third light transmission paths are connected to the path switching unit. The path switching unit outputs light input from the first light transmission path to the second light transmission path; and light input from the second light transmission path to the third light transmission path. The first reflecting element is connected to the second light transmission path and a fourth light transmission path, and reflects light of a first wavelength. The second reflecting element is connected to the fourth light transmission path and reflects light of a second wavelength. The length of the fourth light transmission path is determined based on the transmission rate or frequency of the signal transmitted using light of the second wavelength.

Light of the second wavelength is guided to the third light transmission path by the path switching unit after reflection by the second reflecting element. This path is the originally intended path for light of the second wavelength that is demultiplexed from the wavelength multiplexed light. Hereafter, the light of the second wavelength that is demultiplexed by this way will be called the principal demultiplexed light.

However, in a case in which the first reflecting element reflects part of the light of wavelengths other than the first wavelength, part of the light of the second wavelength is guided to the third light transmission path by the path switching unit, after reflection by the first reflecting element. Light of the second wavelength that is guided to the third light transmission path in this way becomes interference light with respect to the principal demultiplexed light.

The principal demultiplexed light is delayed with respect to the interference light by the time required for light to make one round-trip on the fourth light transmission path. Consequently, the timing difference between the principal demultiplexed light and the interference light can be controlled by adjusting the length of the fourth light transmission path. Here, the timing at which the signal transmitted using light of the second wavelength is in the non-luminous state depends on the transmission rate or the frequency of that signal. Further, deterioration of the principal demultiplexed light by the interference light mainly occurs when both the principal demultiplexed light and the interference light are in the luminous state. Consequently, the deterioration of the principal demultiplexed light by the interference light can be eliminated by adjusting the length of the fourth light transmission path, if the difference in timing between the principal demultiplexed light and the interference light is controlled so that the interference light will be in the non-luminous state while the principal demultiplexed light is in the luminous state.

The light multiplexing device of this invention has, as the configuration for multiplexing signal light of a particular wavelength into wavelength multiplexed light, a path switching unit, connected to first, second and third light transmission paths, which outputs light input from the first light transmission path to the second light transmission path and outputs light input from the second light transmission path to the third light transmission path; a first reflecting element, connected to the second light transmission path and a fourth light transmission path, and which reflects light of the first wavelength; and a second reflecting element, connected to the fourth light transmission path, which reflects light of second wavelength. The length of the fourth light transmission path is determined based on the transmission rate or the frequency of the signal transmitted using light of the second wavelength. The action of this light multiplexing device is basically the same as that of the light demultiplexing device described above.

BRIEF DESCRIPTION OF THE DRAWINGS

FIGS. 7A to 7C are diagrams showing the effect of interference;

FIG. 8A is a configuration diagram of the multiplexing section of the light multiplexing and demultiplexing device of this embodiment;

FIG. 8B is a diagram showing the path of light that transmits the SV signal in the multiplexing section shown in FIG. 8A;

FIG. 10 is a figure showing an example in which the parts that comprise the light multiplexing and demultiplexing device of this embodiment are replaced by other elements.

DESCRIPTION OF THE PREFERRED EMBODIMENT

Figure 4:
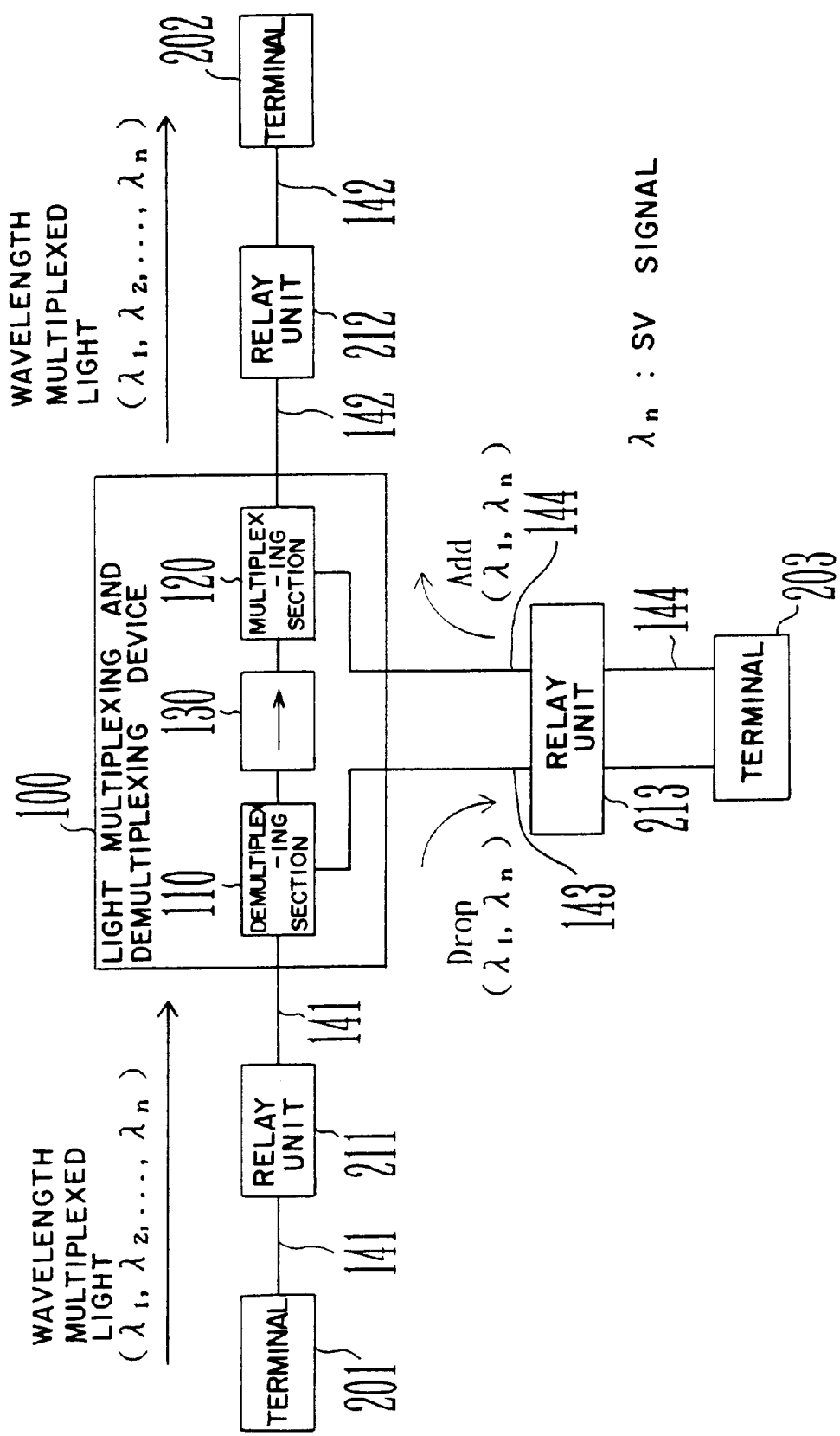
FIG. 4 is a configuration diagram of one example of a communication system that uses the light multiplexing and demultiplexing device of this invention.

FIG. 4 is a configuration diagram of one example of a communication system that uses the light multiplexing and demultiplexing device of this invention. This communication system is a WDM (Wavelength Division Multiplex) network that transmits wavelength multiplexed light among terminals.

The light multiplexing and demultiplexing device 100 consists of a demultiplexing section 110, a multiplexing section 120 and an isolator 130. The demultiplexing section 110 demultiplexes light of the wavelengths $\lambda 1$ and $\lambda n$ from the wavelength multiplexed light that is input via the main transmission path 141 and guides it to the branch transmission path 143. The multiplexing section 120 adds light of wavelengths $\lambda 1$ and $\lambda n$ input via the branch transmission path 144 to the wavelength multiplexed light that is transmitted via the main transmission path 142.

The main transmission paths 141 and 142, and the branch transmission paths 143 and 144, are respectively made of optical fiber. The terminals 201 to 203 are terminal devices that can send and receive wavelength multiplexed light. The relays 211 to 213 are installed on the respective transmission paths and have the function of amplifying the light signals.

The wavelength multiplexed light can multiplex and transmit n signals using the wavelengths $\lambda 1$ to $\lambda n$. In the system shown in FIG. 4, among the wavelengths $\lambda 1$ to $\lambda n$, the wavelength $\lambda n$ is used to transmit a monitoring control signal (called the SV signal below). The SV signal is a signal for the purpose of, for example, monitoring and control of the relay unit; here, it is a clock signal of a specified frequency. Here, in order to use one SV signal to monitor and control all of the relay units 211 to 213, it is necessary to have a configuration in which an appropriate path is specified so that the SV signal passes through all of the relay units. For this reason, in the system shown in FIG. 4, for example the configuration is such that the SV signal output from the terminal 201 is guided to the branch transmission path 143 by the light multiplexing and demultiplexing device 100 and arrives at the terminal 203; after turning around in the terminal 203 it is guided to the main transmission path 142 by the light multiplexing and demultiplexing device 100 and arrives at the terminal 202. The applicant for this patent has previously applied for patents relating to the path of the SV signal (Japanese Patent Application (TOKUGANHEI) Nos. 09-65231 and 09-107090).

As described above, the light multiplexing and demultiplexing device 100 demultiplexes light of wavelength $\lambda 1$ from, or multiplexes light of wavelength $\lambda 1$ to, wavelength multiplexed light. Consequently, for example when a signal is sent from the terminal 201 to the terminal 203, if the signal to be sent is carried on light of wavelength $\lambda 1$, when the terminal 201 sends that signal it is guided to the branch transmission path 143 by the light multiplexing and demultiplexing device 100 and arrives at the terminal 203. Similarly, when the signal is sent from the terminal 203 to the terminal 202, when the terminal 203 sends the signal carried on light of wavelength $\lambda 1$, that signal is guided to the main transmission path 142 by the light multiplexing and demultiplexing device 100, and arrives at the terminal 202.

Among the wavelengths $\lambda 1$ to $\lambda n$, signals which are transmitted using the wavelengths $\lambda 1$ to $\lambda(n-1)$ (signals other than the SV signal) are, for example, transmitted at rates on the order of several hundred Mbps to several Gbps.

Figure 5A:
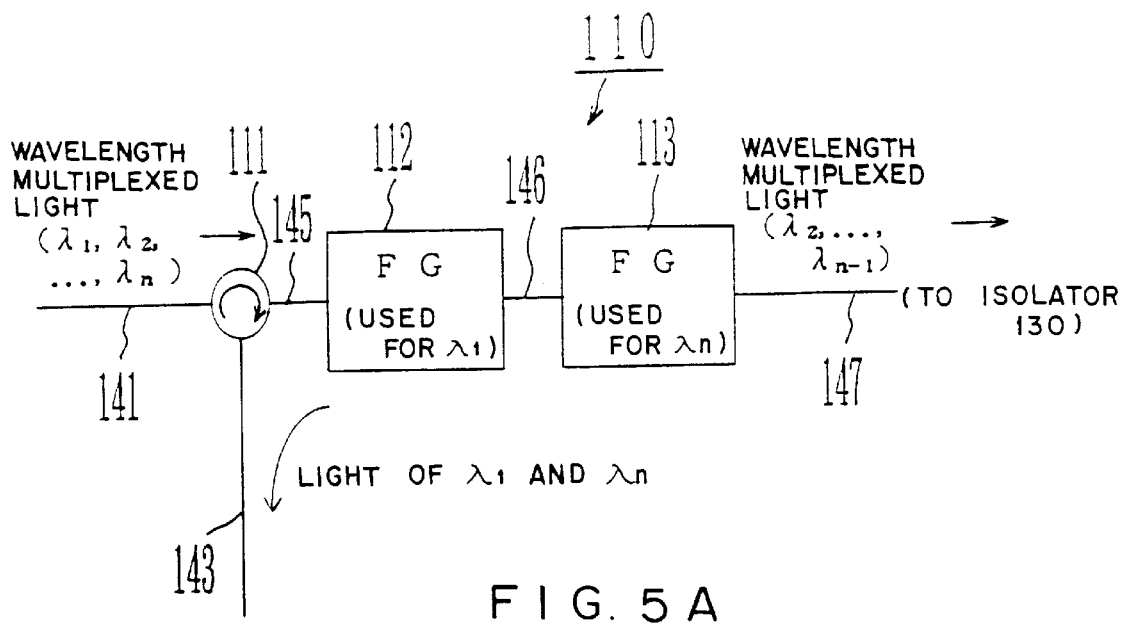
FIG. 5A is a configuration diagram of the demultiplexing section of the light multiplexing and demultiplexing device of this embodiment.

FIG. 5A is a diagram that shows the configuration of the demultiplexing section 110 of the light multiplexing and demultiplexing device 100 of this embodiment. The configuration of the demultiplexing section 110 of this embodiment is basically the same as that of the light demultiplexing unit shown in FIG. 2A as an example of an existing device. That is to say, the circulator 111 and the fiber gratings 112 and 113 shown in FIG. 5A can be respectively the same as the circulator 11 and the fiber gratings 12 and 13 shown in FIG. 2A. However, in the previously existing configuration, particular consideration was not given to the length of the transmission path between the fiber grating 12 and the fiber grating 13; but in the present embodiment, the length of the transmission path (the transmission path 146 in the figure) between the fiber grating 112 and the fiber grating 113 is determined based on the transmission rate or the frequency of the signal transmitted using the wavelength that is reflected by the fiber grating 113.

Figure 5B:
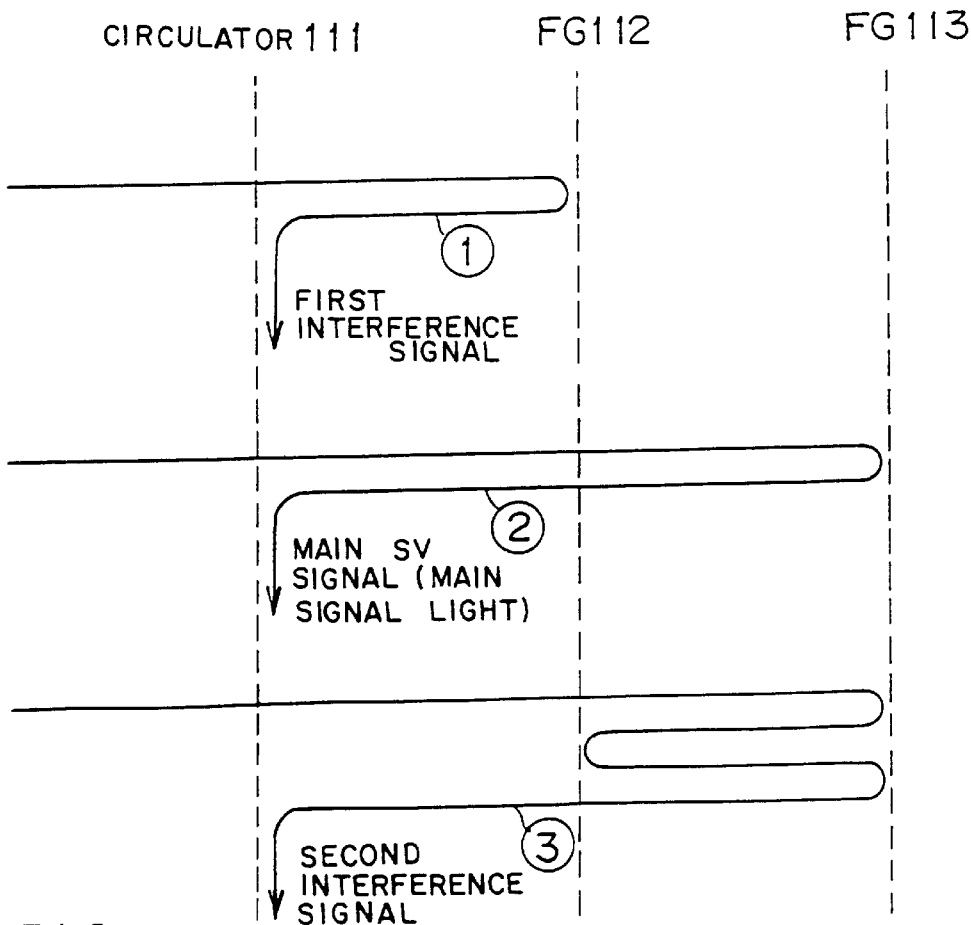
FIG. 5B is a diagram showing the path of light that transmits the SV signal in the demultiplexing section shown in FIG. 5A.

FIG. 5B is a diagram that shows the optical path within the demultiplexing section 110 of the light (light of wavelength $\lambda n$) that transmits the SV signal. As shown by path (2), the light that transmits the SV signal is basically reflected by the fiber grating 113, which is the reflecting element used for $\lambda n$, and is guided to the branch transmission path 143. This reflected light is the basic desired SV signal. Hereafter this SV signal will be called the "main SV signal".

However, the fiber grating 112 also reflects part of the light of wavelengths other than $\lambda 1$. For this reason, part of the light that transmits the SV signal is reflected by the fiber grating 112 and guided to the branch transmission path 143, as shown by path (1). This reflected light becomes interference light with respect to the signal light that transmits the main SV signal. Hereafter, the signal transmitted by this reflected light will be called the "1st interference signal".

Further, part of the light of wavelength $\lambda n$ that is reflected by the fiber grating 113 is, as shown by path (3), further reflected by the fiber gratings 112 and 113; then it passes through the fiber grating 112 and is guided to the branch transmission path 143. This reflected light also becomes interference light with respect to the signal light that transmits the main SV signal. The signal that is transmitted by this reflected light will be called the "2nd interference signal" here.

There is also light that is further reflected between the fiber gratings 112 and 113 several times, then passes through the fiber grating 112 and is guided to the branch transmission path 143, but the power of this light is very small, so it is neglected here.

Figure 6:
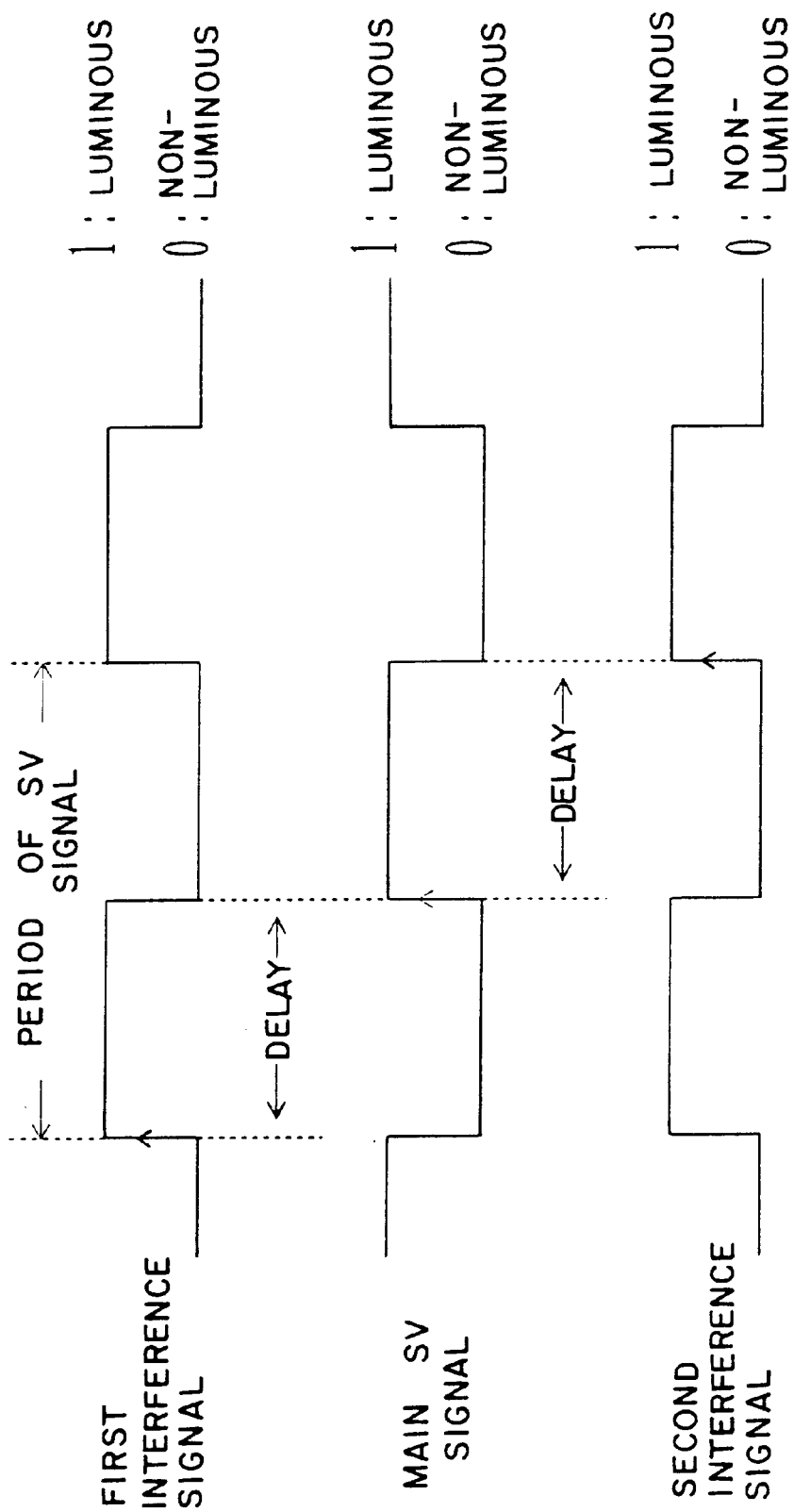
FIG. 6 is a diagram showing the timing of the main SV signal and the interference signal.

FIG. 6 shows the timing of the main SV signal and the interference signals in this embodiment. First, let us compare the main SV signal and the 1st interference signal. Comparing the transmission path of the main SV signal with the transmission path of the 1st interference signal inside the demultiplexing section 110, as shown in FIG. 5B, the transmission path of the main SV signal is longer by just the length of one round-trip between the fiber grating 112 and the fiber grating 113 via the transmission path 146. For this reason, the main SV signal is delayed with respect to the 1st interference signal by the time required for the light to make one round-trip between the fiber grating 112 and the fiber grating 113 via the transmission path 146. Next, let us compare the main SV signal and the 2nd interference signal. Compared to the transmission path of the main SV signal, the transmission path of the 2nd interference signal is longer by the length of one round-trip between the fiber grating 112 and the fiber grating 113 via the transmission path 146. For this reason, compared to the main SV signal, the 2nd interference signal is delayed by the time required for the light to make one round-trip between the fiber grating 112 and the fiber grating 113 via the transmission path 146.

Thus, the delay of the main SV signal with respect to the 1st interference signal, and the delay of the 2nd interference signal with respect to the main SV signal, respectively give the times required for the light to make one round-trip between the fiber grating 112 and the fiber grating 113 via the transmission path 146.

Let us take the delay time to be (n/2) times the SV signal period. Here n is an odd integer (1, 3, 5, . . . ). That is to say, the delay time is such that the phase of the main SV signal and the phases of the interference signals are reversed with respect to one another. Here, this delay time is determined by the length of the transmission path that connects the fiber grating 112 to the fiber grating 113. Consequently, in this embodiment, the length of the transmission path 146 that connects the fiber grating 112 to the fiber grating 113 is adjusted so that the delay of the main SV signal with respect to the 1st interference signal and the delay of the 2nd interference signal with respect to the main SV signal becomes (n/2) times the SV signal period. The reason for setting the length of the transmission path 146 to this value is as follows.

The SV signal is a clock signal of a specified frequency. Consequently, as shown in FIG. 6, when the timings of the main SV signal and the respective interference signals (the 1st and 2nd interference signals) are displaced by (n/2) times the frequency, the interference signals are in the non-luminous state when the main SV signal is in the luminous state; conversely, the interference signals are in the luminous state while the main SV signal is in the non-luminous state. Here, as is generally well-known, 2 light signals interfere with each other to produce coherent cross-talk while both of those light signals are in the luminous state. In this embodiment, as shown in FIG. 6, when the length of the transmission path 146 is set as described above, when the main SV signal is in the luminous state both the 1st and 2nd interference signals are in the non-luminous state. For this reason, the main SV signal is not interfered with by the 1st and 2nd interference signals, and coherent cross-talk does not occur.

Figure 1:
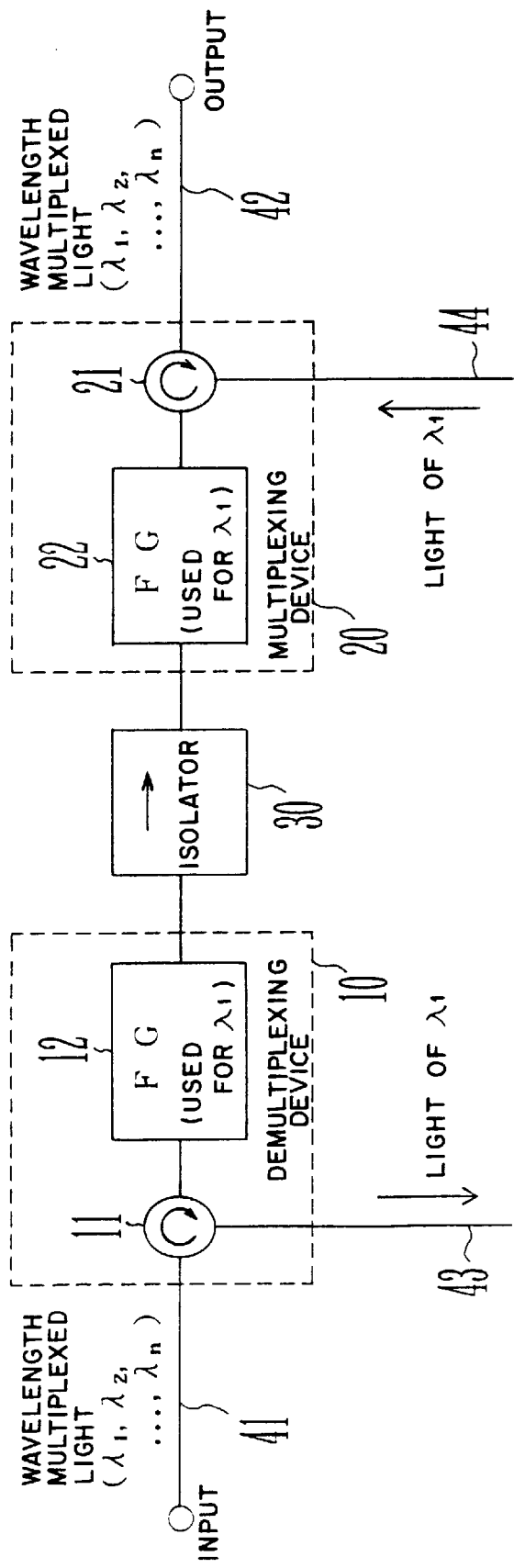
FIG. 1 is a diagram showing the basic configuration of a light multiplexing and demultiplexing device.
Figure 2A:
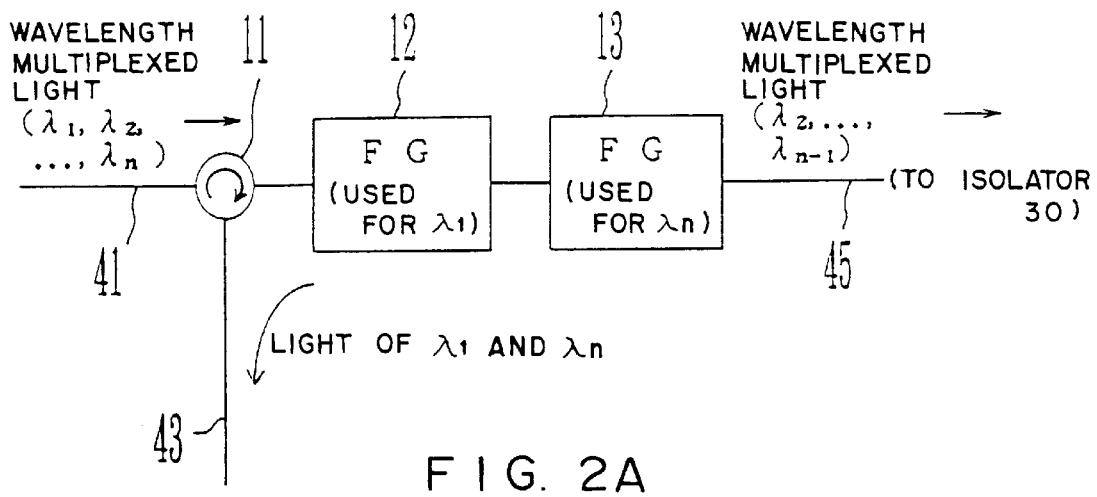
FIG. 2A is a configuration diagram of a light demultiplexing device that extracts light of different wavelengths from wavelength multiplexed light.
Figure 2B:
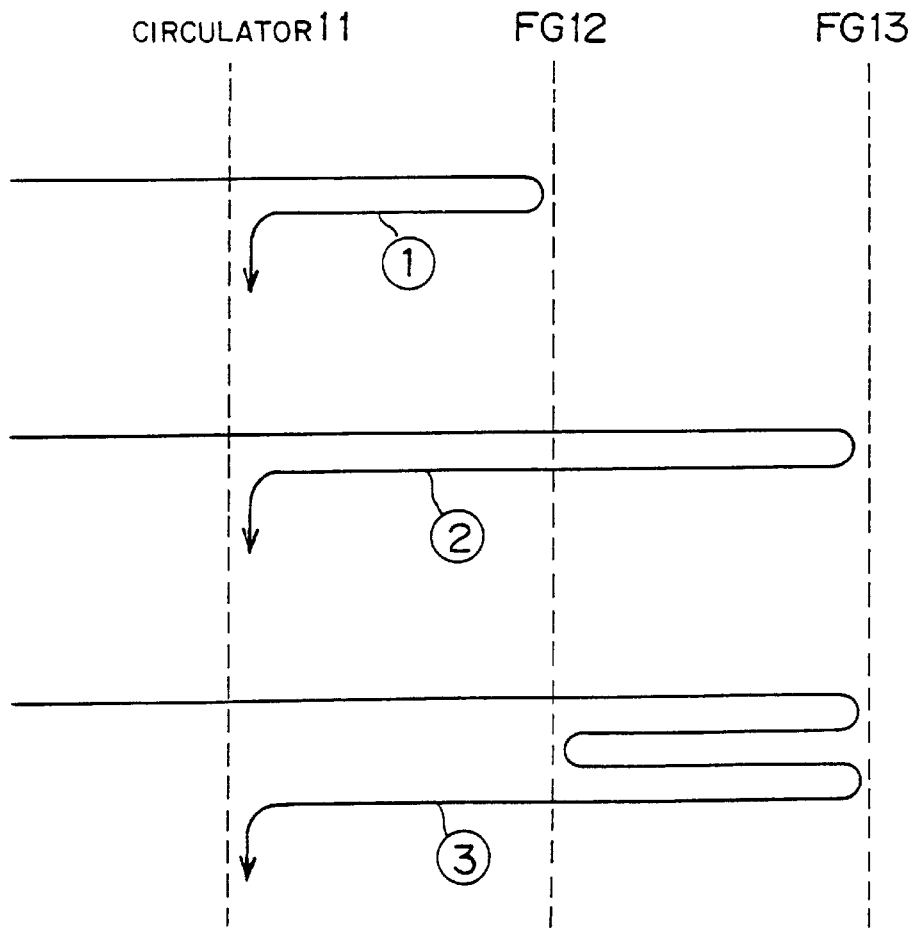
FIG. 2B is a diagram showing the reflection path in the light demultiplexing device shown in FIG. 2A.

In the past, as for example in the device shown in FIG. 2A, the length of the transmission path between the fiber grating 12 and the fiber grating 13 has been determined independently of the frequency of the SV signal. For this reason, coherent cross-talk sometimes occurs and sometimes does not occur, depending on the relation between the length of that transmission path and the SV signal frequency. That is to say, when the length of the transmission path coincidentally happens to agree with the condition prescribed in this embodiment coherent cross-talk does not occur, but when, for example, the length of that transmission path produces a delay that is an integral multiple of the SV signal period, the interference becomes a maximum and the coherent cross-talk becomes large.

FIGS. 7A to 7C show the effect of interference. They show the respective SV signal waveforms in the branch transmission path 143.

FIG. 7A shows the waveform of an ideal SV signal when there is no interference light. This waveform is obtained when, for example, the fiber grating 112 is removed from the demultiplexing section 110 in FIG. 5A. FIG. 7B is the waveform of the SV signal in a case in which the phase difference between the main SV signal and the interference signal is made equal to 0 by adjusting the length of the transmission path 146. FIG. 7C shows the waveform of the SV signal in this embodiment. Thus, in this embodiment, the SV signal waveform is close to its ideal state.

Here we give a specific example of the way of computing the length of the transmission path. With c the speed of light in a vacuum, and $n_1$ the refractivity of the transmission path, the speed of light transmitted through the transmission path is given by formula (1).

$$c/n_1 (m/s) \qquad \text{formula (1)}$$

Next, if we let B (Hz or bps) be the frequency or bit rate of the transmitted SV signal, then, in this embodiment, the delay that occurs when light makes one round-trip through the transmission path 146 is an odd integral multiple of ½B (sec), so the length of the transmission path 146 is given by formula (2).

$$L = \frac{C}{n_1} \cdot \frac{N}{2B} \cdot \frac{1}{2} \quad N \text{ is an odd integer.} \qquad (2)$$

Here, if we take the frequency B of the SV signal to be 10 MHz, and the refractivity of the transmission path 146 to be 1.5, then the lengths of the transmission path 146 become 5 m, 15 m, 25 m, . . .

The embodiment described above was described for the case of an SV signal, but in general the length of the transmission path 146 is determined by the transmission rate of the signal transmitted using light of the wavelength that is reflected by the fiber grating 113. Here we give examples of computation of the length of the transmission path 146 when the transmission rate of the transmitted signal is varied.

B=100 Mbps 50 cm, 1.5 m, 2.5 m, . . .
B=1 Gbps 5 cm, 15 cm, 25 cm, . . .
B=10 Gbps 0.5 cm, 1.5 cm, 2.5 cm, . . .

Thus, the faster the transmission rate of the signal transmitted using light of the wavelength that is reflected using the fiber grating 113, the shorter the length of the transmission path 146 and the more difficult it becomes to adjust it. For example, if we want to keep the error in the length of the transmission path 146 to within +/−10%, if the signal transmission speed is 100 Mbps, then it is sufficient to cut the transmission path to 50+/−5 cm, but at 10 Gbps it becomes necessary to cut it to 5+/−0.5 mm. Consequently, in the system shown in FIG. 5A, when a plurality of signals having different transmission rates are demultiplexed from wavelength multiplexed light, if the signal having the fastest transmission rate is transmitted using the wavelength λ1, while the signal having the slowest transmission rate is transmitted using light of wavelength λn, then the length of the transmission path 146 is adjusted based on the slowest transmission rate, so the error margin becomes large and adjustment becomes easy.

FIG. 8A is a configuration diagram of the multiplexing section 120 of the light multiplexing and demultiplexing device of this embodiment. The multiplexing section 120 has basically the same configuration as the demultiplexing section 110, and in addition its action is basically the same as that of the demultiplexing section 110.

The multiplexing section 120 receives output light from the demultiplexing section 110 through the isolator 130. That is to say, wavelength multiplexed light including the wavelengths λ2 to λ(n−1) is input into the multiplexing section 120. This wavelength multiplexed light passes through the fiber gratings 123 and 122, then is guided to the main transmission path 142 by the circulator 121.

The circulator 121 is connected to the branch transmission line 144. When light of the wavelengths λ1 and λn is received by the circulator 122 via this branch transmission path 144, that light is guided to the transmission path 148. Here it is assumed that the SV signal is transmitted using light of wavelength λn.

Light of wavelength λ1 is basically reflected by the fiber grating 122, then guided to the main transmission path 142 by the circulator 121. Light of wavelength λn is basically reflected by the fiber grating 123, then guided to the main transmission path 142 by the circulator 121. In this way light of wavelengths λ1 and λn that has been transmitted via the branch transmission path 144 is added to the wavelength multiplexed light.

Figure 3A:
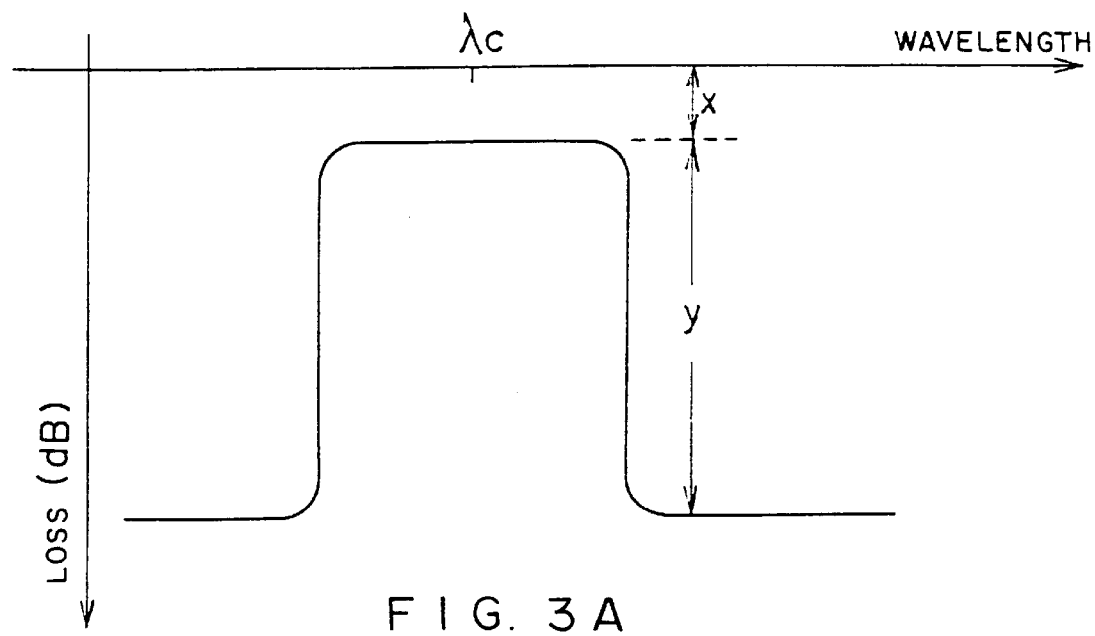
FIG. 3A is a diagram showing the reflection characteristics of a fiber grating.
Figure 3B:
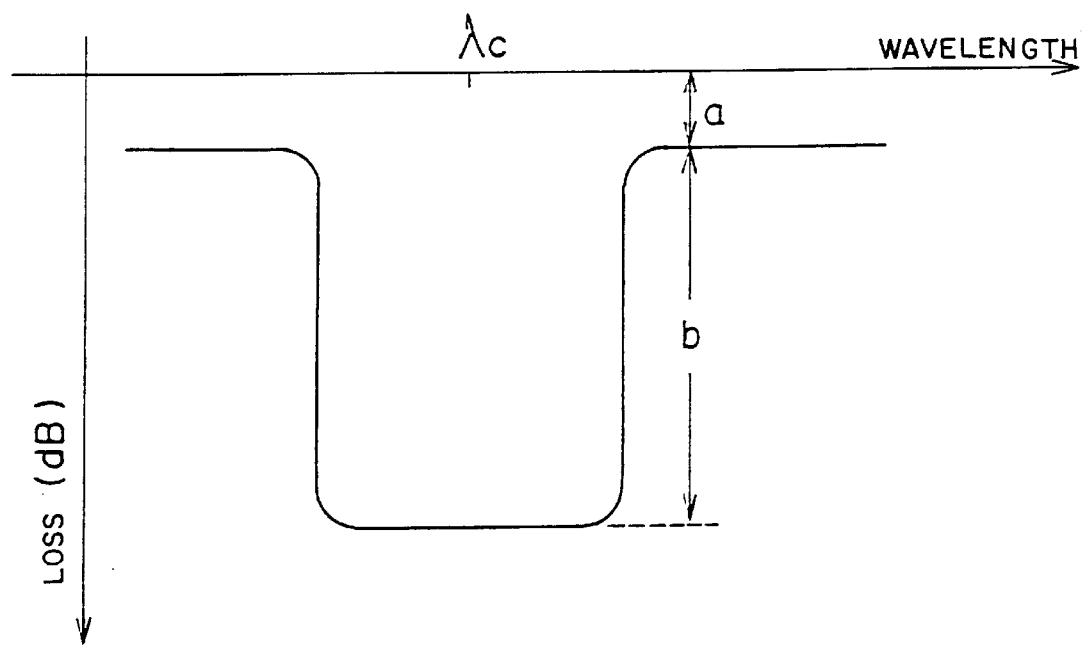
FIG. 3B is a diagram showing the transmission characteristics of a fiber grating.

In the multiplexing section 120, the configuration and actions are the same as in the previously described demultiplexing section in the following points (1) through (4). (1) The characteristics of the fiber gratings 122 and 123 are the same as in FIGS. 3A and 3B. (2) The principal paths of light of wavelengths λ1 and λn inside the multiplexing section 120 can be considered the same as paths (4) to (6) in FIG. 8B. (3) The effect of interference on the signal transmitted using the light of wavelength λ1 that is reflected by the fiber grating 122 is small. (4) If the length of the transmission path 149 is determined independently of the SV signal frequency, there will be large interference with the signal light of wavelength λn that is reflected by the fiber grating 123. Consequently, when an SV signal is added to the wavelength multiplexed light in the multiplexing section 120, to decrease the interference with that SV signal it is sufficient to adjust the length of the transmission path 149 that connects the fiber grating 122 to the fiber grating 123. Concretely, the time that is required for light to make one round-trip through the transmission path 149 is (m/2) times the SV signal period. Here, m is an odd integer (1, 3, 5, . . . ).

In the embodiment described above, the example given was one in which the signal that was the object of suppression of coherent cross-talk was a clock signal, but in this embodiment, the same technique can be applied with respect to a designated data string. However, in this embodiment, it cannot be applied to a modulation method for which it is possible that the luminous state will continue, depending on the transmitted data pattern. For example, in the NRZ method, if the digital data to be transmitted consist of a string of "1"s, the data that are actually transmitted will also consist of a string of "1"s, so the data pattern causes the luminous state to continue, and this embodiment cannot be applied.

Figure 9:
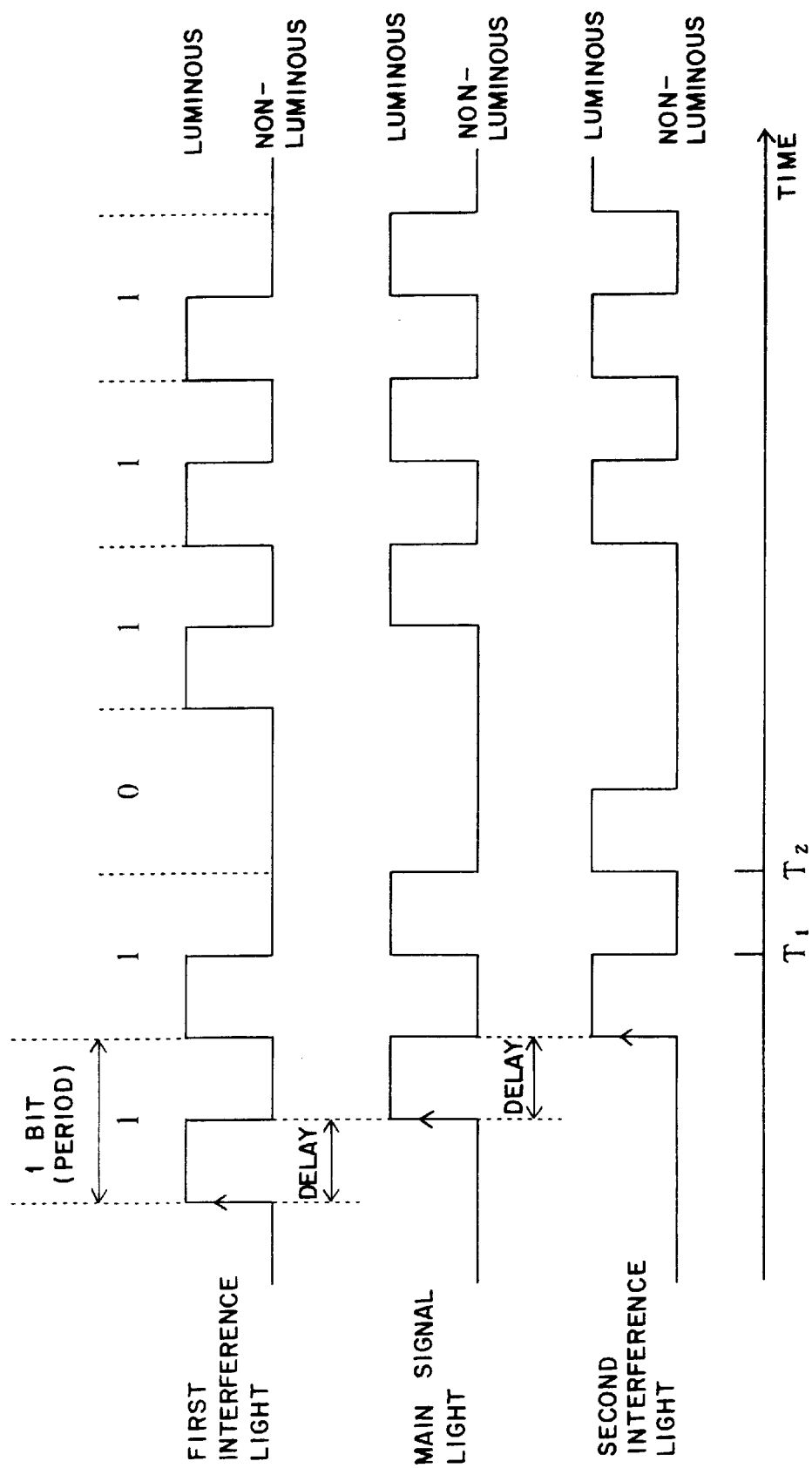
FIG. 9 is a diagram explaining the timing of the signal light that transmits a signal that is modulated by the RZ method, and the corresponding interference light.

In this embodiment, the RZ method is adopted as one of the modulation methods. In the RZ method, if, for example, as shown in FIG. 9, a datum to be transmitted is "0", the non-luminous state exists during the period allotted to that datum; while if the datum to be transmitted is "1", the luminous state exists during the first half of the period allotted to that datum, and the non-luminous state during the second half. Thus, when data are transmitted by the RZ method, the non-luminous state always exists during the latter half of the period allotted to each transmitted data bit, regardless of the value of that data bit. Thus, in this embodiment, when data are transmitted as a light signal, the non-luminous state exists during at least part of the period allotted to each data bit of the transmitted data.

Let us now explain the action in which signal light that transmits data modulated by the RZ method is demultiplexed from wavelength modulated light, referring to FIGS. 5A and 5B. Here, we assume that data to be output to the branch transmission path 143 are transmitted using light of wavelength λn.

In this case, the length of the transmission path 146 is determined in accordance with the transmission rate of data to be output to the branch transmission path 143. Specifically, the length of the transmission path 146 is determined so that the time required for light to make one round-trip through the transmission path 146 is (n/2) times the time allotted to one bit of those data. Here, n is an odd integer.

When the length of the transmission path 146 is determined as described above, the main signal light generated by path (2) in FIG. 5B, and the 1st interference light and the 2nd interference light generated by path (1) and path (3) respectively, are transmitted on the branch transmission path 143 with the timing shown in FIG. 9. That is to say, during transmission the phases of the respective interference light signals are opposite to the phase of the main transmission light. Further, in the RZ method, regardless of the values of the data bits that are transmitted the non-luminous state always exists during the latter half of the time allotted to each data bit. For this reason, while the main signal light is in the luminous state, the respective interference light signals are always in the non-luminous state. For example, the main signal light is in the luminous state from time T1 to time T2; during this same time the respective interference light signals are in the non-luminous state.

If, as in this case, the interference light is in the non-luminous state while the main signal light is in the luminous state, the main signal light will not be attenuated by the interference light. That is to say, since coherence cross-talk occurs when 2 or more light signals are in the luminous state, if, as in this embodiment, the interference light is in the non-luminous state while the main signal light is in the luminous state, coherence cross-talk will not occur, and the main signal light will not be attenuated.

In the example presented above, the action when signal light that transmits data that have been modulated by the RZ method is demultiplexed from wavelength multiplexed light is explained, but the action when signal light that transmits data that have been modulated by the RZ method is multiplexed into wavelength multiplexed light is basically the same.

In addition, in the embodiment described above, the description assumed that each fiber grating reflects only light of the wavelength corresponding to one channel among a plurality of channels transmitted by the wavelength multiplexed light, but it is also possible to have a configuration in which each fiber grating reflects light of wavelengths corresponding to a plurality of channels. In fact, a fiber grating typically has a reflection wavelength band on the order of 1 to 2 nm. Also, typically there will be one channel that transmits a signal every 0.8 to 1 nm in the 1550 nm band. Consequently, it is possible to reflect signal light of wavelengths corresponding to 2 adjacent channels using 1 fiber grating. In this case, in, for example, the configuration shown in FIG. 5A, 3 or 4 light signals can be demultiplexed from the wavelength multiplexed light.

In addition, in the embodiment described above, formula (2) above is used to determine the length of the specified transmission path, but it is permissible for that length to include a certain amount of error. For example, even in a case in which the actual transmission path length has a 50% error with respect to the length determined by formula (2) above, there are experimental results that show that the attenuation of the signal waveform by coherent cross-talk is suppressed as compared with the case in which the main signal light and the interference light have the same phase.

Further, in the embodiment described above, when the length of the specified transmission path is computed, delay caused by the fiber grating was neglected, but if this delay is considered, the characteristics are further improved. In fact, almost no delay occurs when light passes through the fiber grating, but when reflection occurs there is a delay of several ps. Consequently, it is desirable to consider the delay caused by this fiber grating when determining the length of the specified transmission path.

In the embodiment described above, a circulator is used as the component that switches the light path, and a fiber grating is used as the reflecting element, but, as shown in FIG. 10, it is also possible to use an optical coupler in place of the circulator and to use a dielectric multi-layer filter in place of the fiber grating. However, the loss in a circulator is smaller than the loss in an optical coupler, and a fiber grating has better temperature characteristics than a dielectric multi-layer filter.

In a light demultiplexing device that demultiplexes a plurality of light signals from wavelength multiplexed light using a plurality of reflecting elements, the length of the light transmission paths that connect the plurality of reflecting elements are based on the transmission rates or frequencies of the signals that are transmitted using those light signals, so the phase differences between the principal demultiplexed light signals that are the main components of the demultiplexed light signals and the corresponding interference light signals can be adjusted so that the luminous periods of the main demultiplexed light signals coincide with the non-luminous periods of the interference light signals. When this is done, the interference light does not affect the main light signals, so that coherent cross-talk does not occur.

Coherent cross-talk can be similarly prevented in a light multiplexing device that multiplexes a plurality of light signals into wavelength multiplexed light using a plurality of reflecting elements.

What is claimed is:

1. A light demultiplexing device that receives wavelength multiplexed light and demultiplexes light of a first wavelength and light of a second wavelength from the wavelength multiplexed light, comprising:

an optical device, connected to first, second and third light transmission paths, introducing the wavelength multiplexed light from the first light transmission path to the second light transmission path;

a first reflecting element, connected to the second light transmission path and a fourth light transmission path, receiving the wavelength multiplexed light via the second transmission path and reflecting light of the first wavelength to the optical device via the second transmission path; and a second reflecting element, connected to the fourth light transmission path, receiving the wavelength multiplexed light via the second and fourth transmission paths and reflecting light of the second wavelength to the optical device via the fourth and second transmission path; wherein the optical device introduces the light of the first wavelength and the light of the second wavelength from the second transmission path to the third transmission path, and wherein the length of the fourth light transmission path is determined based on a transmission rate or a signal frequency.

2. The light demultiplexing device according to claim 1, wherein the signal that is transmitted using the second wavelength is a clock signal of a specified frequency; and the length of the fourth light transmission path is a length such that the time required for light to make one round-trip through the fourth light transmission path is n/2 times the period of the clock signal, or an approximation to that length, where n is an odd integer.

3. The light demultiplexing device according to claim 1, wherein the signal that is transmitted using the second wavelength is an RZ signal having a specified transmission rate; and the length of the fourth light transmission path is a length such that the time required for light to make one round-trip through the fourth light transmission path is n/2 times the time allotted to one bit of the RZ signal, or an approximation to that length, where n is an odd integer.

4. The light demultiplexing device according to claim 1, wherein the transmission rate or frequency of the signal transmitted using the second wavelength is slower or lower than the transmission rate or frequency of the signal transmitted using the first wavelength.

5. A light multiplexing device that multiplexes light of a first wavelength and light of a second wavelength into wavelength multiplexed light, comprising:

an optical device, connected to first, second and third light transmission paths, introducing light of the first wavelength and light of the second wavelength from the first light transmission path to the second light transmission path, and introducing wavelength multiplexed light from the second light transmission path to the third light transmission path;

a first reflecting element, connected to the second light transmission path and a fourth light transmission path, receiving the light of the first wavelength and the light of the second wavelength via the second transmission path and reflecting the light of the first wavelength to the optical device via the second transmission path; and a second reflecting element, connected to the fourth light transmission path, receiving the light of the second wavelength via the second and fourth transmission path and reflecting the light of the second wavelength to the optical device via the fourth and second transmission path; wherein the optical device introduces the light of the first wavelength and the light of the second wavelength to the third transmission path, and wherein the length of the fourth light transmission path is determined based on a transmission rate or a signal frequency.

6. The light multiplexing device according to claim 5, wherein the signal that is transmitted using the second wavelength is a clock signal of a specified frequency; and the length of the fourth light transmission path is a length such that the time required for light to make one round-trip through the fourth light transmission path is m/2 times the period of the clock signal, or an approximation to that length, where m is an odd integer.

7. The light multiplexing device according to claim 5, wherein the signal that is transmitted using the second wavelength is an RZ signal having a specified transmission rate; and the length of the fourth light transmission path is a length such that the time required for light to make one round-trip through the fourth light transmission path is m/2 times the time allotted to one bit of the RZ signal, or an approximation to that length, where m is an odd integer.

8. The light multiplexing device according to claim 5, wherein the transmission rate or frequency of the signal transmitted using the second wavelength is slower or lower than the transmission rate or frequency of the signal transmitted using the first wavelength.

9. A light multiplexing and demultiplexing device that has a light demultiplexing section that demultiplexes signal light of a particular wavelength from wavelength multiplexed light and a light multiplexing section that multiplexes signal light of a particular wavelength into wavelength multiplexed light, comprising:

said light demultiplexing section, including:

a first optical device, connected to first, second and third light transmission paths, for outputting light input from the first light transmission path to the second light transmission path, and outputting light input from the second light transmission path to the third light transmission path;

a first reflecting element, connected to the second light transmission path and a fourth light transmission path, for reflecting light of a first wavelength; and a second reflecting element, connected to the fourth light transmission path, for reflecting light of a second wavelength; wherein the length of the fourth light transmission path is determined based on a transmission rate or a frequency of the signal that is transmitted using the second wavelength; and said light multiplexing section, including:

a second optical device, connected to fifth, sixth and seventh light transmission paths, for outputting light input from the fifth light transmission path to the sixth light transmission path, and outputting light input from the sixth light transmission path to the seventh light transmission path;

a third reflecting element, connected to the sixth light transmission path and an eighth light transmission path, for reflecting light of a third wavelength; and a fourth reflecting element, connected to the eighth light transmission path, for reflecting light of a fourth wavelength; wherein the length of the eighth light transmission path is determined based on a transmission rate or a frequency of the signal that is transmitted using the fourth wavelength.

10. The light demultiplexing device according to claim 9, wherein the first wavelength and the third wavelength are the same as one another; and the second wavelength and the fourth wavelength are the same as one another.

* * * * *